June 25, 1968   N. B. WALES, JR., ET AL   3,390,359
SEQUENTIAL POWER SWITCH
Filed May 5, 1966   3 Sheets-Sheet 1
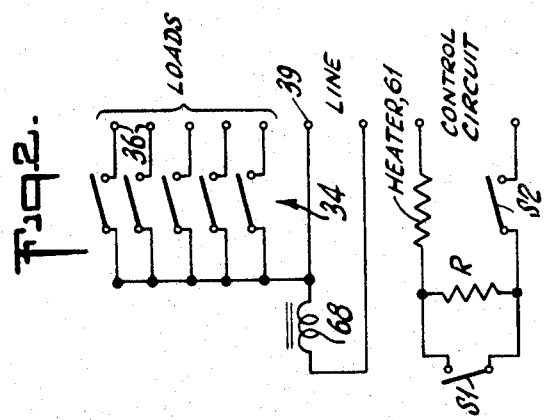
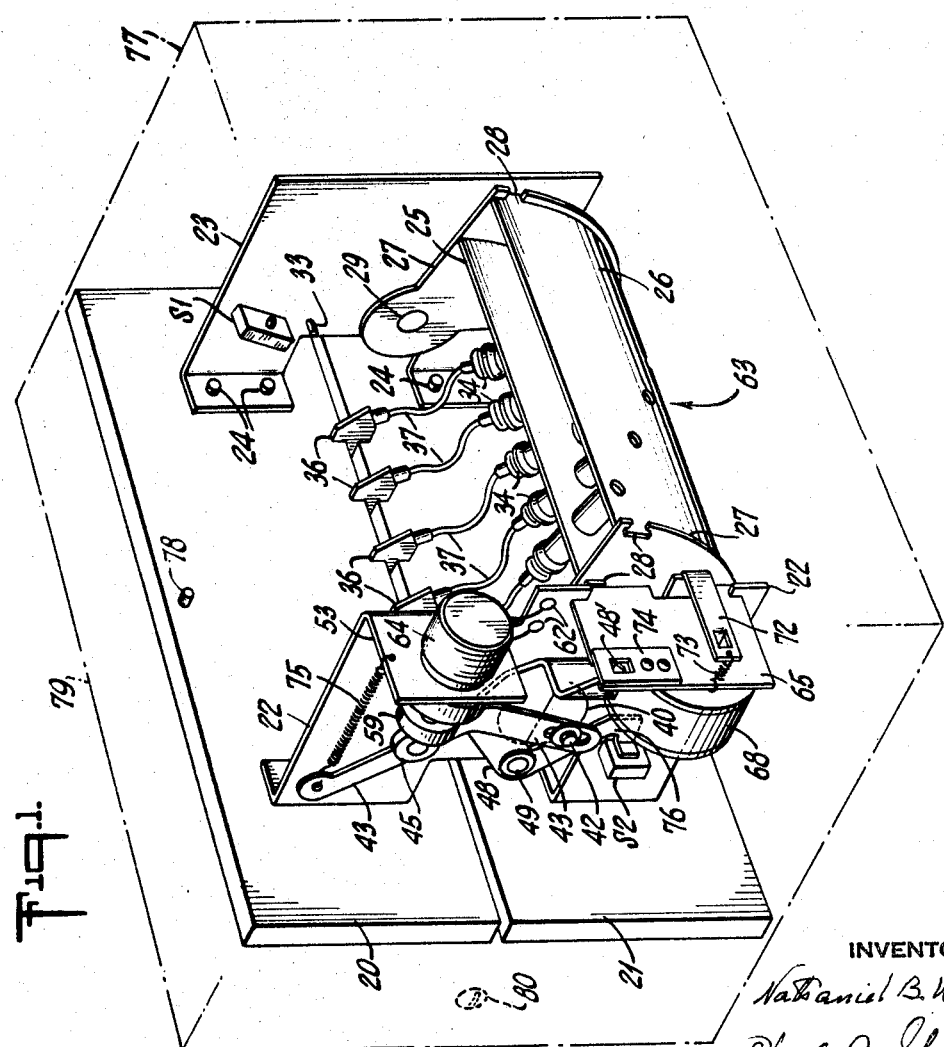
INVENTORS
Nathaniel B. Wales, Jr.
Charles B. Gray June 25, 1968   N. B. WALES, JR., ET AL   3,390,359
SEQUENTIAL POWER SWITCH
Filed May 5, 1966   3 Sheets-Sheet 2
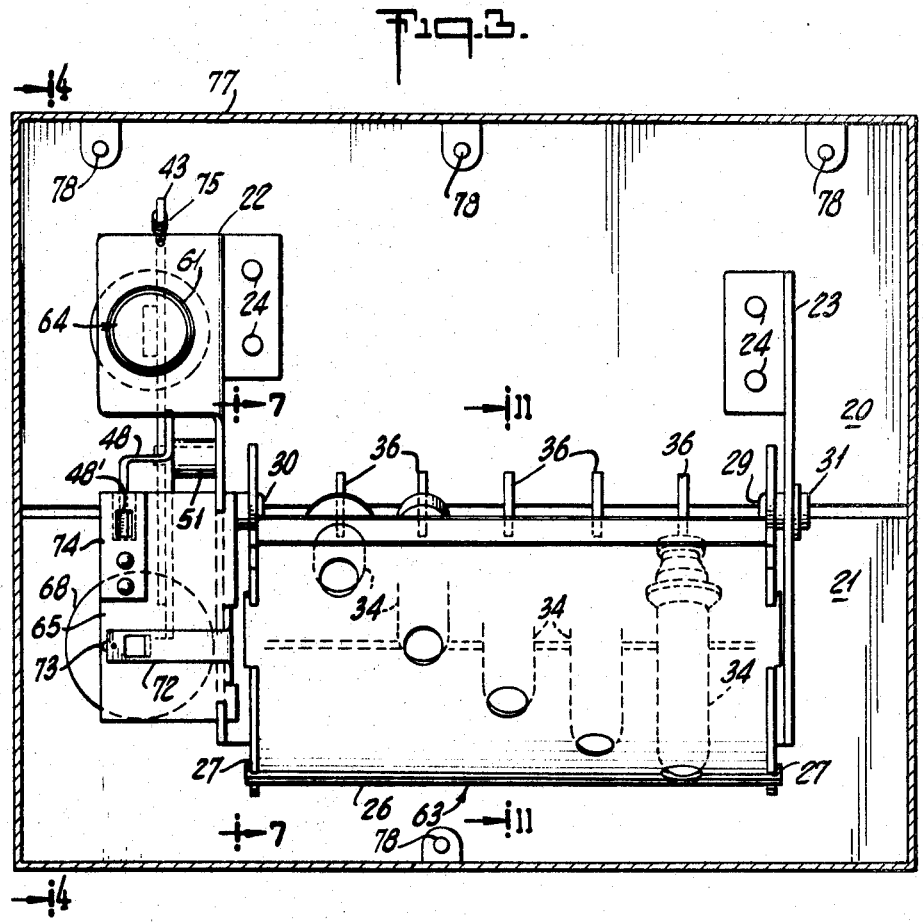
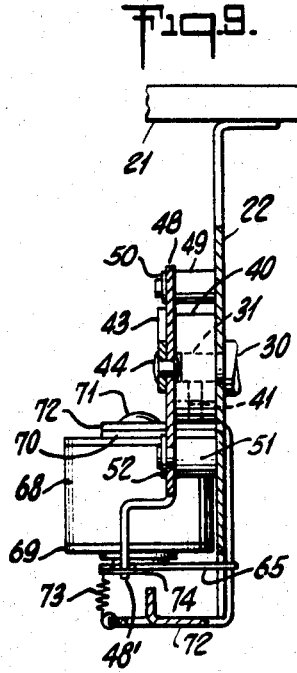
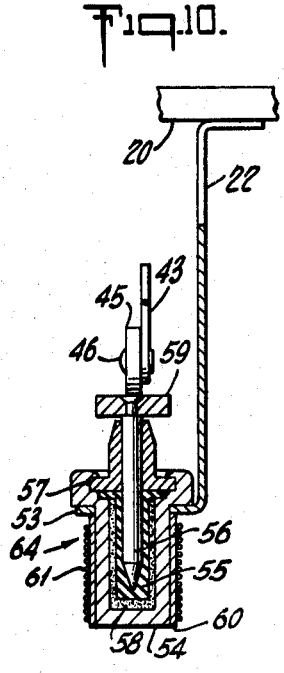
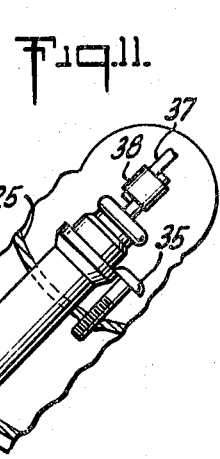
INVENTORS
Nathaniel B. Wales Jr.

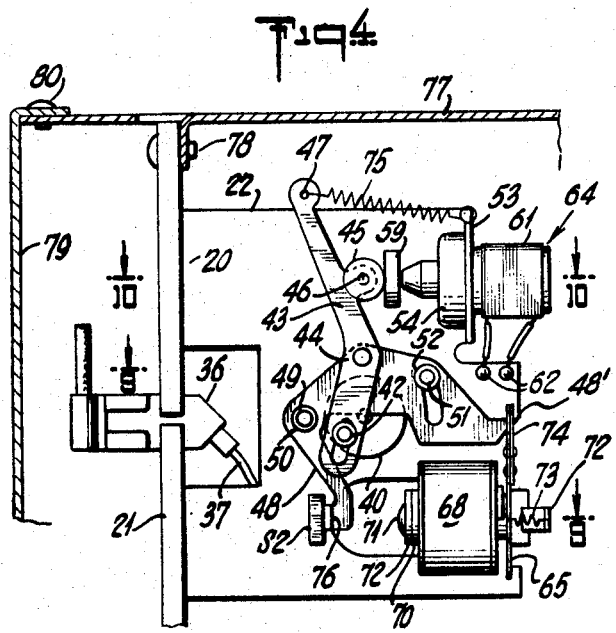
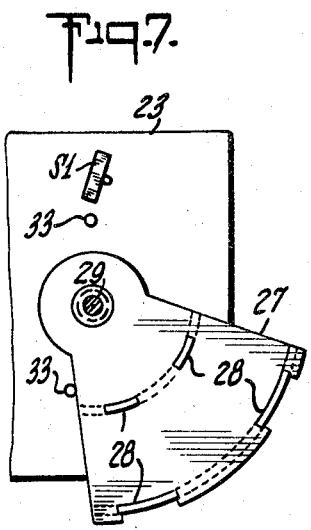
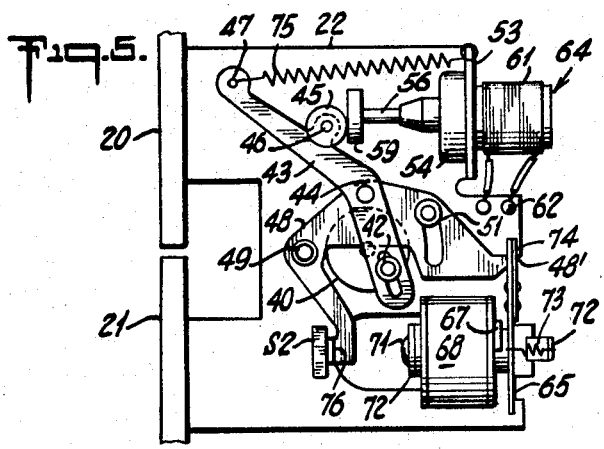
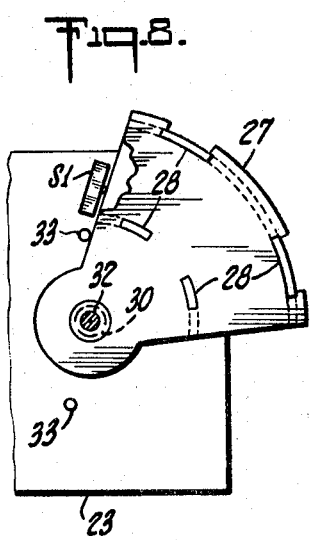
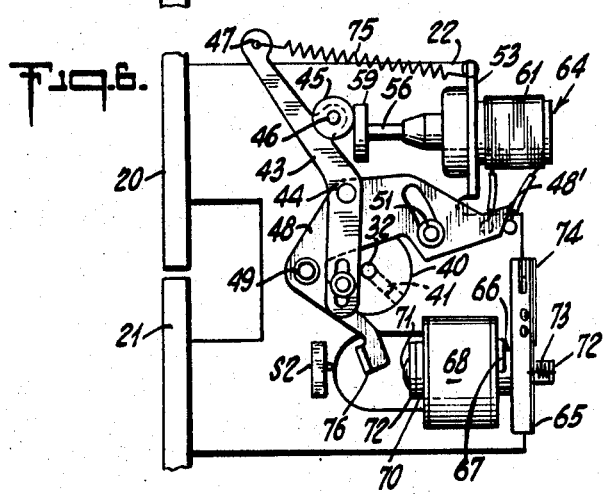
INVENTORS
Nathaniel B. Wales
Charles B. Gregor

United States Patent Office 3,390,359
Patented June 25, 1968

3,390,359
SEQUENTIAL POWER SWITCH
Nathaniel B. Wales, Jr., New York, N.Y., and Charles B. Grady, Jr., West Orange, N.J., assignors to The Metrodynamics Corporation, Red Bank, N.J., a corporation of New Jersey
Filed May 5, 1966, Ser. No. 547,885
3 Claims. (Cl. 335—31)

ABSTRACT OF THE DISCLOSURE

A plurality of power switches are sequentially closed by the thermal expansion of a drive member in response to its heating initiated by a power demand. The absence of power demand allows the switches to open in reverse sequence as the drive member slowly cools. Bias means urge all power switches to open, and a latch electromagnetically held closed by the presence of switchable power couples the switches to the thermal drive member. Power failure thus allows the latch and switches to open rapidly. The demand heater is disabled by this unlatching until the cooling drive member relatches the switches.

---

This invention relates to an electric switching programmer for use with high power loads such as domestic electric space or water heaters where it is desired to gradually switch the load on or off the supply line so as to protect the power distribution system from sudden overloads.

The present invention accomplishes this division of the total load by providing a plurality of gravity operated mercury switches mounted at different angles to the horizontal in a cradle pivoted on a horizontal axis. Each such mercury switch is devoted to the control of an equal portion of the total load. In order economically to effect the relatively slow sequential closure or opening of these switches, this invention teaches the use of an electrically heated thermal actuator such as a vapor driven bellows, an expansible wax actuator, or a bimetallic scroll.

This disclosure also meets the requirement that, in the event of a power failure, the device will rapidly open all of its load switches, and, when the power is re-established, will not reinsert its loads on the line except at its usual slow sequential rate. This requirement is met in this invention by providing a line monitoring actuator which in the presence of line power holds the switches in an operable position, but, on the occasion of power failure, releases the load switches to an open position. On re-establishment of line power, this invention provides an interlock which prevents the foregoing line monitoring actuator from re-enabling the load switches or thermal actuator heater until the thermal sequencing actuator is in its cold, or "off" position.

A feature of the invention is to design the mercury switch cradle so that the axis of its pivots passes close to the flexible leads through which the loads electrically communicate to the switches, thereby minimizing the flexing fatigue.

It is the principal object of the subject invention to provide a reliable and inexpensive sequential programming switch for divisible high power electrical loads, which will prevent peak reloading in the event of a temporary power failure.

Another object of the invention is to provide a design of sequential programming switch using a minimum of parts and actuating power, while satisfying the requirements of long life and low maintenance.

For other objects and a clearer understanding of the invention, reference is made to the following detailed specification, to be taken in conjunction with the accompanying drawings, in which:

FIGURE 1 is a perspective view of the preferred embodiment of the invention, showing the mercury switch cradle and its associated mechanism;

FIGURE 2 is an electrical schematic diagram of this sequential switch showing the load division, line monitoring, and control circuitry;

FIGURE 3 is a rear view in elevation of the mechanism of FIGURE 1 showing the angularly staggered array of mercury switches;

FIGURE 4 is a side view in elevation taken through the plane 4—4 of FIGURE 3, and showing the cradle positioning mechanism in its "off" or cold position;

FIGURE 5 is a view through the same plane as that of FIGURE 4, but showing the positioning mechanism in its "on" or hot position;

FIGURE 6 is also a view through 4—4 of FIGURE 3, but one in which the cradle positioning mechanism is shown in the position which results from a power line failure which takes place when the thermal actuator is in its hot configuration;

FIGURE 7 is a fragmentary view through plane 7—7 of FIGURE 3 showing the cradle in its down or off position corresponding to FIGURE 4 or 6, and the stand-by switch in its normally closed position;

FIGURE 8 is a view similar to that of FIGURE 7 but showing the cradle in its up or on position corresponding to that of FIGURE 5, and showing the stand-by switch in its actuated open condition;

FIGURE 9 is a plan section through the line 9—9 of FIGURE 4 showing the latching mechanism;

FIGURE 10 is a plan section through the line 10—10 of FIGURE 4 showing the internal construction of the preferred melting wax thermal expansion actuator; and, FIGURE 11 is a view through plane 11—11 of FIGURE 3 showing the mounting and pigtail securance of a typical mercury switch.

Referring to the drawings numerals 20 and 21 represent two side-by-side vertical panels made of an insulating plastic material, and which are secured together by two sheet metal angle brackets 22 and 23 to the feet of which the panels 20 and 21 are secured by screws 24.

Brackets 22 and 23 form the journal supports for a metal cradle 63 consisting of a curved inner cradle deck 25, a curved outer cradle deck 26, and two cradle end plates 27 to which decks 25 and 26 are secured by twist tabs 28 (FIGURE 7).

Two pivot studs 29 and 30 are riveted to the outer sides of cradle end plates 27, and are provided with pivot shafts 31 and 32 respectively which pass through and are journalled in brackets 23 and 22 respectively, to allow the cradle to rotate 90° between the stop pins 33 riveted to bracket plate 22.

Five cylindrical mercury switches 34 (FIGURE 11) are provided, each having a ferrous body cup and a contact pin separated by an annular glass collar. In operation, when the cup end of the axis of the switch is raised above the horizontal, the mercury in the cup flows towards the pin so as to bridge the cup and pin electrically thereby closing the switch, and vice versa.

The switches 34 pass through holes in deck 25 and are clamped between decks 25 and 26 by screws 35. The switches 34 are located so that their axes lie in parallel equidistant planes normal to the axis of the cradle, which passes through the tip of each switch. The axes of the switches are progressively inclined to the horizontal so that in the "off" position shown in FIGURE 1 the cup end of the axes of adjacent switches lie respectively at 15°, 30°, 45°, 60° and 75° below the horizontal.

Evidently, if the cradle is slowly rotated between its lower and upper stops, the switches will sequentially close, and conversely, on lowering the cradle, they will sequentially open in reverse order.

A plurality of notched metal terminal lugs 36 are secured and captivated in a series of adjacent slots in the facing edges of panels 20 and 21, and five of these are provided with flexible metal braid jumpers 37 which connect each switch pin by means of a spring clip lug 38 (FIGURE 11) to its corresponding terminal 36. A sixth lug 36 is connected by a braid jumper 37 to an end plate 27 by a lug 39 to provide a common switch return lead. It is evident that by locating the switches 34 so that their leads 37 pass close to the axis of cradle angulation, the wire fatigue and lead flexure is minimized.

Pivot shaft 32 forms the drive shaft for the switch cradle, and on the outboard side of plate-bracket 22 it is secured to a drive hub 40 by set screw 41 (FIGURE 6).

Hub 40 is provided with a drive pin 42 which engages a slot in drive lever 43, which in turn is pivoted on stud 44 and is provided at its outer end with a roller 45, a roller pivot stud 46, and a spring anchor hole 47 (FIGURE 4).

A tab 53, bent up from bracket plate 22, serves as a support for a thermal actuator 64 (FIGURE 10) which comprises a metal body cup 54, an elastic cylinder 55, a conically ended piston 56 positioned within cylinder 55, a closure bushing 57, and an expandable wax filler 58, which occupies the annular space between the cup 54 and the elastic cylinder 55. The outer end of piston 56 is flush riveted to a drive plate 59 which contacts roller 45 of drive lever 43.

The outer end of thermal actuator cup 54 is provided with an electrical heater comprising an insulating glass fabric 60 surrounding cup 59, and a winding of "Nichrome" heater resistance wire 61, the ends of which are secured to insulated terminals 62.

In operation, when heater terminals 61 are suitably electrically energized, the cup 54 will heat, and when its temperature reaches the melting point of wax 58 it will expand, gradually building up a very high hydraulic pressure, which will tend to collapse elastic cylinder 55 and gradually squeeze piston 56 outward with a large force through a substantial stroke, typically, 30 pounds force through a half inch stroke for a ¾ cubic inch actuator. This force, applied through roller 45 to drive lever 46 and drive pin 42 (FIGURES 4 and 5) will overcome the weight of the cradle 63 and, after a preheat period of 2 to 3 minutes, will lift the cradle through its 90° stroke during a tilt time of approximately 1 minute. Conversely, when heater coil 61 is de-energized, after a precooling time of 2 to 3 minutes, the cradle will descend to the off position during the subsequent minute of cooling.

The pivot stud 44 of drive lever 43 is secured to a latch lever 48, which in turn is pivoted relative to bracket plate 22 by stud 49 and retaining spring E-ring 50. A guide stud 51 secured to plate 22 passes through an arcuate slot in latch lever 48, and, in conjunction with E-ring 52, serves to stabilize the locus of lever 48 to remain parallel to plate 22. Normally, the outer latch finger of lever 48 is locked (in the position shown in FIGURES 4 and 5) by the notched latch armature 65 which is pivoted on plate 22, and which is attracted to the alternating magnet pole 66 and copper shading 67 by the flux generated by normally energized coil 68 wound on bobbin 69. Plate 22, being made of steel, forms the magnetic return circuit through a support tab 70 to which pole 66 is secured by screw 71.

Armature 65 is retained near its pivot axis by a nonmagnetic finger 72, which also forms an anchor for spring 73, which extends between finger 72 and armature 65, tending to pull the latter away from pole 66 and to unlatch lever 48. Auxiliary fingers on finger 72 also form a stop limiting the "off" position of armature 65. A thin metal apertured cantilever spring leaf 74 secured to the outer corner of armature 65 forms the actual catch surface for latch lever 48 so that during the process of relatching when lever 48 is rotating clockwise (FIGURE 6) about pivot 49, it will not have to overcome the force of energized magnet pole 66, but can relatch merely by overcoming the light spring force of leaf 74 by cam action.

The purpose of the magnetic latch coil 68 and latch lever 48 is to monitor the presence of line voltage, and to take special shut-down action in the event of power failure. For this reason, while lever 48 is latched (FIGURES 4 and 5), the pivot point 44 of drive lever 43 is fixed relative to plate 22, and the lifting and lowering of cradle 63 by actuator 64 is as described.

In the event of power failure, and when the cradle is in its raised "on" position, armature 65 will disengage lever 48 due to spring 73, and the cradle will be released (FIGURE 6) to drop immediately to its "off" position because the reaction force on pivot stud 44 will rotate the released lever 48 counter-clockwise, moving pivot 44 to the left, and allowing the slot in lever 43 and the cradle pin 42 to move leftward thereby dropping the cradle, even though drive plate 59 and roller 45 have not moved.

An actuator return spring 75 extending between hole 47 in drive lever 43 and the edge of tab 53 now tends to relatch lever 48 as rapidly as the cooling of actuator 64 permits. Latch lever 48 is provided with a switch arm 76 which closes the circuit of a switch $S_2$ when the lever 48 is in a position showing it to be fully latched under leaf 74. Switch $S_2$ is electrically in series with heater 61 and, consequently, the latter is disabled as soon as a power failure occurs, and remains so until wax 58 has cooled down enough to allow lever 48 to relatch under the urging of spring 75. A second normally closed switch $S_1$ actuated by the fully "on" position of cradle 63 is provided to change the mode of heater coil 61 from "heating" to stand-by or "idling." Switch $S_1$ electrically shorts a limiting resistor R in series with heater coil 61 so that when the heat demand control cirucit (see FIGURE 2) is initially energized, the actuator 64 will be heated relatively rapidly, but that when the lifting stroke has been accomplished (FIGURE 8), the power consumption will be dropped by the opening of switch $S_1$ to a predetermined value just capable of keeping the cradle raised.

The assembly supported on chassis plates 20 and 21 is housed in a box 77 to which it is attached with screws 78. A lid 79 with closure screws 80 completes the device.

It is evident that there are many variations which will occur to those skilled in the art under the scope of this invention. This scope is defined by the following claims.

What is claimed is:
1. A sequential power switch comprising:
a frame;
a plurality of electrical power switches mounted proximate to said frame;
a power switch actuating member movably mounted on said frame whereby displacement of said member in a first direction will close said power switches in a first sequence, and whereby displacement of said member opposite to said first direction relative to said frame will open said switches in reverse to said first sequence;
a first force bias means to urge said switch actuating member to move in said switch opening direction;
a thermally expansible drive member having a first part secured to said frame, and a second part movable in one direction with respect to said frame in response to said expansion during heating and in the opposite direction in response to its contraction during cooling of said drive member;
an electrical power demand heater mounted on said frame in thermal communication with said thermal drive member;
a latch member linking the mechanical motion relative to the frame of the second part of said drive mem- ber to said switch actuating member, whereby heating of said thermal drive member moves the said actuating member in said first switch closing direction;

a second force bias means to urge said latch member to disengage the linking between said drive member and said switch actuating member whereby to allow said first force bias means rapidly to return said power switches to their open position; and, an electromagnet energized by the power distributed by said power switches, and mounted with respect to said frame to act between the frame and said latch member whereby, when energized, to overcome said second unlatching bias means and to maintain the said mechanical linkage between said drive member and said switch actuating member only as long as said distributable power is present to energize said electromagnet.

2. In a switch according to claim 1:
an electrical disabling switch in series with said electrical heater; and
means responsive to the unlatching of said latch member to open said disabling switch.

3. In a switch according to claim 1:
cam means responsive to the cooling motion of said drive member to reengage said latch member between said drive member and said actuator member.

References Cited
UNITED STATES PATENTS

| | | | |
|---|---|---|---|
| 1,667,056 | 4/1928 | Smith | 200—50 |
| 2,122,050 | 6/1938 | Stuart | 200—122 |
| 2,355,894 | 8/1944 | Ray | 200—83 |
| 2,391,068 | 12/1945 | Nye | 200—83 |
| 2,883,490 | 4/1959 | Larson | 200—140 |
| 2,924,975 | 2/1960 | Vernet | 200—140 |

BERNARD A. GILHEANY, *Primary Examiner.*

H. B. GILSON, *Assistant Examiner.*